(12) United States Patent
Bromer

(10) Patent No.: US 6,476,715 B1
(45) Date of Patent: Nov. 5, 2002

(54) LAND VEHICLE IDENTIFICATION BY FLICKERING LAMPS

(76) Inventor: Nick Bromer, 402 Stackstown Rd., Marietta, PA (US) 17547-9311

( * ) Notice: Subject to any disclaimer, the term of this patent is extended or adjusted under 35 U.S.C. 154(b) by 0 days.

(21) Appl. No.: 09/987,241

(22) Filed: Nov. 14, 2001

Related U.S. Application Data

(60) Provisional application No. 60/290,687, filed on May 15, 2001.

(51) Int. Cl.[7] ................................................. B60Q 1/26
(52) U.S. Cl. .................... 340/468; 340/425.5; 340/479; 340/905
(58) Field of Search ................................ 340/468, 471, 340/942, 905, 479, 425.5, 426, 928, 901, 904; 235/384; 307/10.5, 10.3, 10.8; 342/457

(56) References Cited

U.S. PATENT DOCUMENTS

| | | | |
|---|---|---|---|
| 5,172,113 A | * 12/1992 | Hamer | 340/907 |
| 5,181,062 A | 1/1993 | Kazumi | |
| 5,321,245 A | 6/1994 | Kazumi | |
| 5,343,267 A | 8/1994 | Kazumi | |
| 5,381,207 A | 1/1995 | Kazumi | |
| 5,422,473 A | * 6/1995 | Kamata | 340/928 |
| 5,568,406 A | * 10/1996 | Gerber | 340/937 |
| 5,870,215 A | * 2/1999 | Milano et al. | 342/45 |
| 6,087,932 A | * 7/2000 | Belgard | 340/468 |
| 6,152,588 A | * 11/2000 | Scifres | 362/496 |
| RE37,290 E | * 7/2001 | David | 340/471 |

* cited by examiner

Primary Examiner—Brent A. Swarthout

(57) ABSTRACT

Vehicles are identified by flickering LED's that may be mounted on their sides and/or incorporated into the brake lights or running lights. The flickering encodes an identifier, preferably the VIN (vehicle identification number), in binary format using a barcode type of encoding, ASCII, etc. The VIN is decoded by a detector. The detector may be coupled to a database to record a vehicle's identifier and/or to determine if the vehicle is stolen or wanted. If the identifier of a wanted vehicle is found, an alarm is sounded and/or information about the vehicle can be displayed. The flicker may repeat continuously or be repeated continually, at intervals. The intervals are preferably greater than the flickering duration, so that the flickers are spaced apart and therefore flickers from a group of vehicles will not overlap, permitting each vehicle to be individually identified without spatial localization. Because the LED's turn on and off rapidly, the flickers provide a very clean signal and misreadings are minimal.

20 Claims, 1 Drawing Sheet

LAND VEHICLE IDENTIFICATION BY FLICKERING LAMPS

CROSS-REFERENCE TO RELATED APPLICATION

Benefit is claimed of the filing date of Provisional Patent Application 60/290,687, filed on May 15, 2001 by the same applicant, the whole disclosure of which (specification, drawing, claims, and abstract) is entirely incorporated herein by reference.

FIELD OF THE INVENTION

The present invention relates to identification of land vehicles.

DESCRIPTION OF THE RELATED ART

Automatic remote identification of vehicles is useful for many purposes, but existing technologies are inadequate. A license plate is the standard identifier, but license plates cannot be read reliably by automatic equipment. The relationship between a vehicle and its license plate changes each time that the owner or the state of registration changes, complicating database access.

The E-Z Pass system now in use in the northeastern U.S. equips each vehicle with a radio tag for remote identification, and identifies passing vehicles with automatic radio transponders. However, such radio tags are unreliable and the system requires a back-up system of license plate imaging—which is itself unreliable. With radio tags, only one vehicle at a time can be identified and the identification range is limited to about eight feet of roadway. E-Z Pass uses 900-MHz radio waves, which about one foot long; such long waves cannot be beamed back from the vehicle, which must therefore be near to the sensor.

Bar codes have also been used for identifying vehicles at toll booths, but bar codes have several drawbacks (discussed below) and cannot be read at any distance or from different directions.

Under federal law (49 C.F.R. §565), each vehicle has a Vehicle Identification Number (VIN) that is permanently and uniquely assigned to that vehicle. The VIN would be a better identifier, when searching for a stolen or wanted vehicle, than a license plate number. However, the VIN is written in tiny characters and can only be read when a vehicle is stopped. Like a license plate, a VIN plate is easy to alter or fake.

Ideally, it would be possible to read the VIN of any vehicle from a distance, rapidly and automatically, and it should be difficult to alter or fake that VIN reading. But this has been impossible prior to this invention.

SUMMARY OF THE INVENTION

This invention determines the identity of any vehicle instantly, from any distance, and with high accuracy, using available and inexpensive technology. The rapidity and accuracy of the invention will make possible a number of applications, some of which are discussed below.

Basically, a vehicle identifier (preferably the VIN) is encoded into a flickering LED lamp mounted on the vehicle. The flickers are preferably pre-set at the factory to radiate the VIN in a binary digital format: the lamp when lit signifies logical "1" and when off signifies logical "0". Each character of the VIN is encoded by a few digital bits according to a code, and transmission of the whole VIN is almost instantaneous. An ordinary LED, of the type already used for brake lights in many vehicles, is capable of turning on and off quite rapidly and can flicker out a complete VIN in a small fraction of a second.

A light-sensing detector, aimed at the flickering lamp, can read the VIN using the same technology that already reads bar codes at every store checkout. Bar code scanners sort out flickering light patterns from background noise, decode the flickering, and access a databank; the detector of this invention does exactly the same thing.

Because light sensors are highly directional, a vehicle with a flickering lamp can be identified from almost any distance by using a telescopic detector.

The flickers are preferably emitted intermittently, so that their flickers will not overlap and the VIN's of a group of vehicles can be read at the same time; but the flickers can still be repeated many times each second from each vehicle. This means that all of the vehicles in a traffic jam, or all the vehicles passing one point on a busy interstate, can be identified and registered.

The VIN read by the detector can be used to alert authorities that a particular vehicle is at a detector, to access databanks containing information about a vehicle, or to register that the vehicle has passed some checkpoint (e.g., an automatic toll booth or the entrance to a parking garage).

The electronic circuits that drive the flickering lamp are less complex than those of a four-function calculator or a digital watch. The invention can be made with off-the-shelf components in a very small package. If mass-produced, it could be put entirely onto a single silicon chip. The cost of making and installing the flickering lamp will be small, about a dollar. The detectors, too, use available and inexpensive technology.

The invention can increase theft deterrence and speed recovery of stolen vehicles. Once a vehicle is reported as stolen, its VIN number will be put into a database. Automatic detectors, that are mounted on police cars or along traffic routes, will continuously scan for VIN numbers on the list and notify the authorities within seconds whenever a vehicle's LED flickers out a VIN in the stolen-car database.

The flickering LED's that encode the VIN can be mounted on the side of the vehicle and/or incorporated into red LED brake lamps or running lamps. Because of the high flickering rate, the output will appear steady, just as a movie or TV image, that is actually flickering, appears steady. Infrared LED's, like those used in a TV remote, can be employed to make the flickering invisible.

The memory chip encoding the VIN can be placed where it is difficult to tamper with, and/or where tampering will be evident, and the LED and its circuit can be potted (embedded in epoxy) to prevent tampering. To fake the flickers will require of thieves electronic memory-chip programming and construction of an electronic circuit, and tampering will be evident without cosmetic bodywork after installation. Alternatively, especially for after-market use, the flickering unit can be made easy to install and/or remove.

This invention can include augmented VIN's with an extra, secret character known only to authorities; that will allow detection of faked VIN's by consulting a central agency having a list of valid VIN's.

BRIEF DESCRIPTION OF THE DRAWING FIGURES

DETAILED DESCRIPTION OF THE PREFERRED EMBODIMENTS

Figure 1:
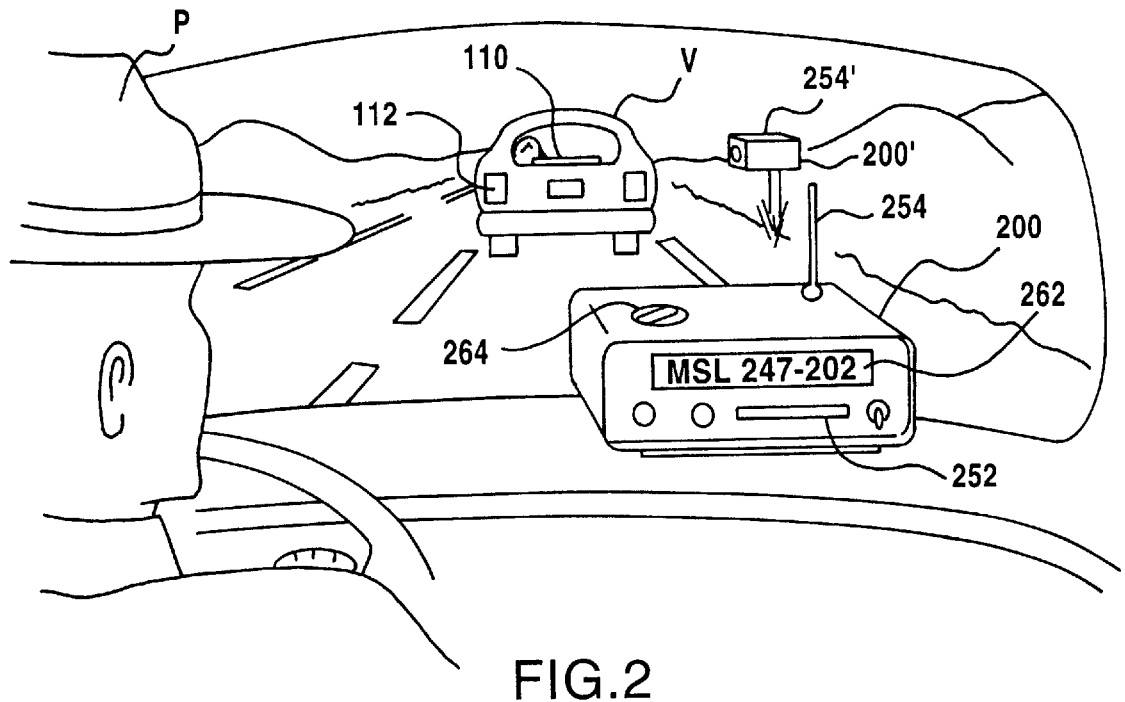
FIG. 1 is a perspective view of this invention in use by police.

FIG. 1 shows a preferred embodiment of the invention in use by a police officer P, who is following a vehicle V. On the rear of the vehicle V is a red LED brake lamp 110. While the brake pedal is depressed, the lamp 110 does not shine steadily but flickers. The flickering is in a pattern that encodes a unique identifier of the vehicle V. The flickering pattern can alternatively be emitted by the running light lamp 112; this is discussed below.

The preferred identifier is the vehicle's VIN (vehicle identification number), comprising 17 alphanumeric characters. The invention can also use a predetermined subportion of the VIN if it uniquely identifies the vehicle; for example, the 12th through 17th characters of the VIN, that comprise the actual number for that vehicle, and/or the 10th character that gives the model year.

A detector 200 is mounted on the dashboard of the police officer's car. The detector 200 is preferably directional, with its reception pointed forward toward the lamp 110. (A detector can also be hand-held, and/or telescopic.) The detector 200 has a light sensor (not shown in FIG. 1), for example a photodiode, that turns the flickering light into a signal voltage that is analyzed by the electronics of the detector 200 (discussed below). The electronics are similar to the electronics used in bar code readers, and if the flickering is encoded in a standard bar code encryption like Code 93, off-the-shelf electronics can be used in the detector 200 to obtain the vehicle's identifier, in an alphanumeric or numeric format, from the flickering light.

Figure 2:
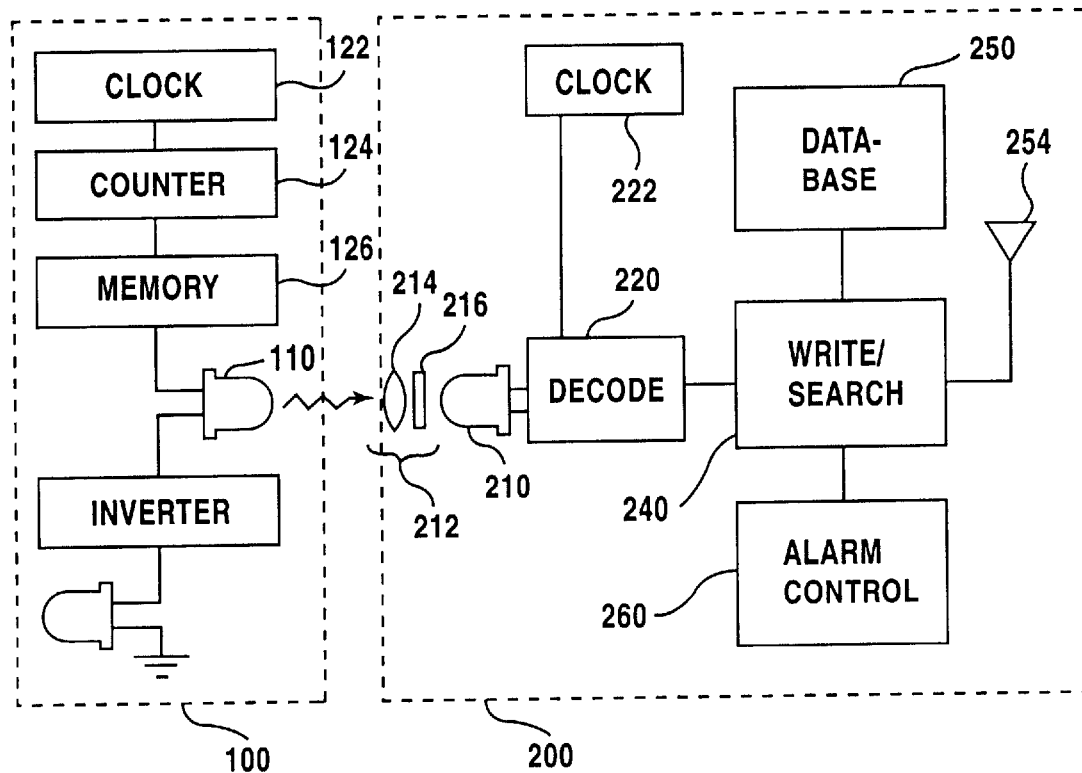
FIG. 2 is a schematic view of the invention.

The detector 200 can now access a database (250, illustrated in FIG. 2). If the detected VIN of the vehicle V is in the database, the police officer P is alerted by an alarm that preferably includes a display 262 that displays the license plate number of the vehicle V and the reason it is wanted. The alarm may also include a loudspeaker 264 that speaks the license number and reason the vehicle is wanted, or just buzzes to alert the officer P to read the visual display 262. Any type of alarm/notification can be used in this invention, and any or no information can be provided to the user.

The database 250 is preferably internal to the detector 200 and loaded via CD-ROM or the like into a slot 252, and/or is loaded or augmented via a radio antenna 254. The detector 200 can also access a remote database (not shown) as an alternative or in addition to the preferred internal database 250.

A fixed roadside detector 200' can also read the VIN of the vehicle, and store it in memory and/or search an internal database and alert authorities via an antenna 254'; of course, other data transfer means (not shown) such as underground cables or infrared beams can be used, too. Any data transfer means can be used to load or unload an internal database in this invention, including but not limited to cables, radio, cell phone, or Internet. The identifier of every vehicle passing the detector 200' can optionally be recorded on some removable medium and/or transferred to a remote database, as well as being searched on a database list of wanted vehicles for remote alarm purposes.

FIG. 2 shows the preferred electronic operations of the invention in schematic form. The lamp 110, preferably a red or infrared LED, is driven by a free-running clock 122 through a counter 124 and a memory 126. The clock 122 preferably runs freely whenever it is powered: for examples, when the brake pedal is depressed; when the running lights are on; when the ignition is on; or whenever the vehicle battery is connected. The clock 122 may be also be triggered, in alternative embodiments. As the clock 122 runs, it increments the counter 124, and the counter outputs binary integers that increment unit by unit (e.g., 0000, 0001, 0010, 0011, ...) while the clock 122 is running. This output from the counter is used as an input to the memory 126, so that the contents of locations in the memory 126 are successively read out to control the output of the lamp 110. That is, each of the integers output from the counter finctions as a memory selector. If the addressed memory location stores "1" the lamp 110 is lit, and if stores "0" the lamp 110 is dark (or, the other way around if desired). Inverters, amplifiers, transistors, and the like can be added to the circuit as needed, or the entire circuit as illustrated can be replaced with some other equivalent circuit that does the same job of making the lamp 110 flicker out a predetermined pattern.

The VIN is preferably stored in the memory 126 at the factory. One preferred type of memory is a PROM (Programmable Read-Only Memory); this type of memory is blank until it is permanently set by "burning" on a commercially-available machine; by using a PROM or equivalent, the VIN or other identifier can be quickly and permanently set into any one of a number of identical and therefore inexpensive memory devices. The clock 122, counter 124, memory 126, and/or the LED lamp 110 can all be manufactured on one chip for lower cost and greater reliability. Such a unit would perhaps require only two connections: one to the powering voltage (e.g., a brake light switch activated by the brake pedal), and another to ground, or to a driven LED lamp (e.g., the brake lamp). A third wire could drive another lamp or set of lamps, if desired. Any number of connections is covered by this invention.

Flickering light from the LED 110, indicated in FIG. 2 by a jagged arrow, goes from the unit 100 in the vehicle to the detector 200. The light may pass through an optical system 212 to illuminate a light-sensitive transducer 210, such as a photodiode or phototransistor, which generates a voltage or electric current signal corresponding to the light impinging on it; or, the photodetector may be bare. The optical system 212 may include, as desired, a reflector or lens 214 to concentrate the flickering light and a filter 216 to eliminate light of other wavelengths. For example, if the lamp 110 is a common red LED that outputs light of wavelength 660 nanometers, then a narrow-pass 660-nanometer optical filter will improve the signal-to-noise ratio by excluding most other light. The lens 214 can be of the cylinder type if a stretch of roadway is to be covered, or for use in the dashboard-mounted detector 200 shown in FIG. 1. The LED 110 can also beam light out through its own optical system (not shown).

The electric voltage signal output from the photo diode 210, that follows the intensity of the flickering light, is analyzed and decoded by a decoder 220. The decoder 220 may use commercially-available bar-code software (or, it can use similar or other software, and/or equivalent circuits). The decoded identifier is preferably now in ASCII format, for convenient data transfers and further processing.

The decoder 220 is coupled to a database 250 by a write/search control 240, including a search engine and/or a capability of writing to the database 250. In the embodiment pictured in FIG. 1, the search control 240 searches the database 250 for a match to an identifier just received from the decoder 220. (Fast-arriving identifiers can be queued.) If a match is determined, the alarm control 260 notifies the user. For the roadside detector 200', the write/search control may write every identifier received from the decoder 220 into the database 250, for reference.

The write/search control 240 is preferably also coupled to an external link such as the antenna 254 or 254' of FIG. 1, so that identifiers and/or other information can be sent and received.

The database 250 could as an alternative store identifiers in the same format as the binary flickering, so that no decoding would be needed for database access, and the decoder 220 could be eliminated. However, this might complicate database maintenance and so is less preferred.

Other architectures than that shown in FIG. 2 can be used, as long as the identifier flickered from the vehicle V can be stored or compared to stored identifiers. (FIG. 2 also shows a clock 222 coupled to the decoder 220. This is discussed below.)

The action described above is analogous to that of a retail bar code system in which the decoded identifying number of a scanned item is checked against a database list of items on sale. If the item is not on the list, no additional action is taken; if it is on the list, and therefore on sale, the price is discounted and the clerk may be alerted by an alarm, such as a display on a cash register, stating the item is on sale.

COMPARISON TO BAR CODE TECHNOLOGY. For encoding the full VIN, a widely-used alphanumeric bar code encryption, such as Code 93, Code 39, or Code 128, may be advantageous because decoding software is available. Another possibility is to use the ASCII code to convert the VIN to binary digits, and then to encode the binary digits using the 2 of 5 Code, a bar code in which spaces are uniform in length and bars are of two lengths, short and long. In this invention, the spaces might take the form of intervals of no light and the bars be intervals of light emission (or, the converse). If the identifier is numeric (e.g., if a numeric portion of the VIN is used as the identifier), then a known numeric encoder such as UPC can be used. Any code, conventional or custom, can be used. Codes used in TV remote controls can also be adapted to this invention.

The electric signal from the photo diode 210 will be decoded very rapidly as compared to the signal received by a bar-code scanner, because the decoding software has much less work to do than when a bar code is read. There are several reasons why the flickering light of this invention is easy to read.

(1) The flickering lamp of this invention produces a very clean signal. An ordinary 660-nm LED has a turn-on or turn-off time of about 200 ns, that is, $2\times10^{-7}$ S, fifth of a millionth of a second, and that means that the pulses from the LED have hard vertical edges and will appear on an oscilloscope as a "square wave" type of signal. The pulses do not need to be "digitized" as do the signals read by a bar code scanner, which are wavy due to the width of the scanning dot and imprecise printing of the bar code, as is explained at page 83 of "The Bar Code Book" by Roger C. Palmer, 3rd Ed., Helmers Publishing Company, Peterborough, NH, ISBN 0-911261-09-5, essential portions of which are incorporated herein by reference.

(2) A bar code scan produces a variable bit rate because the bar might be farther or closer to the scanner, may be tilted, or may be on a round surface like the outside of a tin can. But the clock 122 of the unit 100 can easily be to have a precise output, so the detector 200 will not need to adjust the timing of the digitized pulses; their timing will be constant.

(3) In this invention, the light intensity will not vary over the time interval occupied by one repetition of the flicker; that is because the environment (e.g., the distance of a moving vehicle from the detector) will not vary appreciably over the duration of one brief flicker pattern. This also simplifies the processing and software requirements as compared to bar code reading.

(4) The flickering signal of the invention is never reversed, which happens in bar code scanners when the laser beam retraces its path or the scanned item is held the other way around. The UPC bar codes used in retailing include start and end code portions, to inform the decoding device of when the bar code is backwards. This, of course, complicates decoding and increasing processing time.

Thus, the software and processing requirements in this invention are less stringent than those for bar code reading, and persons of skill in the art will have no difficulty in choosing an existing system, simplifying existing bar code software, or designing new software, for this invention.

Because the flickers from the lamp 110 can be decoded very fast and reliably, the identities of large numbers of vehicles can be registered very quickly. For example, all of the vehicles passing a detector on a busy interstate highway at rush hour could be detected and their VIN's stored.

TIMING OF THE FLICKERS. The flicker rate or binary bit rate can be quite rapid. As noted, an ordinary red LED has an on-off time of about 200 ns, that is, $2\times10^{-7}$ s or a fifth of a millionth of a second. Because of this rapid switching between light-emitting and non-light-emitting states, short binary-bit pulse intervals of, for instance, $0.5\times10^{-5}$ s (a two-hundred-thousandth of a second) are practical for transmission by LED. The latter interval is 250 times as long as the first.

A standard VIN has 17 characters. Assuming for example that the ASCII code is used, in which each letter or character is represented by seven bits (for example, "B" is 1000010), the entire VIN transmission comprising 140 bits will take less than one thousandth of a second with the bit length of a two-hundred thousandth of a second from the example above. The bit rate can be adjusted as needed in view of various factors of the electronic hardware and the environment.

The repetition rate (the rate or frequency at which an entire VIN transmission is repeated), in the example above, can be as rapid as 1000 repetitions per second (1 kHz, which is the inverse of the VIN transmission duration: $\frac{1}{1000}s=1$ kHz). But such a high repetition rate is not needed, and a rate substantially lower that the flicker duration is preferred, for the following reasons.

The repetition rate should be low enough that the probability of overlapping flickers from different vehicles is low, since the flicker-recognition software used by the detector will have trouble distinguishing simultaneous flickers. If a police officer is scanning a line of stopped cars, so that many of their brake lights are on at the same time, it will be best if only one brake light is flickering at any one time; then, the detector can read them all sequentially without having to sort out interfering flickers. The repetition rate may be varied slightly from vehicle to vehicle, so that chance overlaps between vehicles will not recur over and over.

Conversely, the repetition rate should also be high enough that one VIN is flickered even when the driver "taps" the brake pedal, and also high enough that at least one complete VIN flicker pattern will be radiated during the time that a traveling vehicle is within the optical angle of view of a roadside detector. A car moving at 60 mph travels a bit more than one foot in a hundredth of a second, so even if the repetition rate is as low as 20 Hz (twenty repetitions per second), a roadside detector need only cover twenty feet of a vehicle's path to insure the occurrence of one flicker while the vehicle in view. Because the brightness of the image of the flickering LED is proportional to the narrowness of the angle of view, a higher rate will increase the reading ability of a fixed detector.

Any repetition rate over about twenty per second will appear to the eye as a steady light (due to the persistence of vision) and will not distract a person's attention. For this reason, the preferred repetition rate is higher than the persistence time of the human eye, which is about a twentieth of a second (20 Hz).

Some brake lamps are already made with LED's and running lamps can also include LED's. Those vehicles are already set up with a bright, multi-LED lamp easily adapted to this invention. To avoid reducing the brightness of the stop light, a flickering brake lamp should remain on (emitting light) for a large majority of the time. Therefore, the flickers should preferably be interspersed between periods of steady light emission that last longer than the flicker itself.

If the flicker lasts for only a thousandth of a second, as in the example above, and the repetition rate is 100 times a second, the brake lamp's light output will decrease only ½ of one percent due to the flickering of the invention. That is calculated by the fact that the flickering intervals will be one percent of the total time, and the lamp will emit light for about half the time during each interval of flickering.

As compared to a lamp that is off (not emitting light) between flicker repetitions, the flickering of stop lamps or running lamps may be repeated at a lower rate without the flicker being visible, because of the steady shining in between flicker repetitions. (The flickering itself will be much too rapid to be perceived as an interruption in the steady shining of the lamp). For example, a repetition rate of only 1 Hz (one repetition each second) might be advantageous for a brake-lamp (or tail light) application of this invention, because a greater number of vehicles can be scanned simultaneously, and the very bright brake lamps are visible from far off. A detector aimed at a congested roadway has the potential to detect the flickers of hundreds or thousands of vehicles. This invention therefore contemplates different repetition rates for different lamps on the same vehicle (or, different vehicles).

Because it may be desirable to halt the flickering for relatively long intervals, a preferred drive circuit for the lamp 110 might include some kind of delay circuit, so that long periods of non-flickering would not need to be recorded in memory as a monotonous series of 1's or 0's, avoiding a large memory 126 with most memory areas devoted to the time interval between flickers.

OVERLAPPING FLICKERS. Despite the provision of a relatively long quiescent period between flickers, and the variation of repetition rate from vehicle to vehicle, there might be overlaps of flickers from two vehicles both impinging on the photo detector 210 at the same time. This does not arise with bar code reading, so off-the-shelf bar code software will not be able to separate the two signals.

Referring to FIG. 2 again, a preferred embodiment of this invention includes a detector clock 222 coupled to a decoder 220 of the detector 200. The rate of the clock 222 is preferably set equal to (or to a multiple or even fraction of) the rate of the clock 122 of the flickering unit 100. When a flicker signal arrives at the decoder 220 from the photo detector 210, the decoder can then determine the phase difference between the incoming signal and the clock 222 pulses, and use that to discriminate one flicker signal from another. For example, the raw signal can be converted from a "square wave" to spikes triggered by the leading edges of the raw signal, and time-filtered according to its phase. In this way, a signal with any other phase is filtered out. Persons of skill will understand that two or more signals can be read simultaneously with this method by using two filters and two analyzing circuits. The clock 222, when synchronized with the clock 122 or a multiple of it, can also be used to help decode a single flicker.

Because of the signal strength of any one signal is constant, as mentioned above, two overlapping signals can also be separated according to their signal strengths (amplitudes).

This invention also covers an alternative embodiment of the detector (not shown) in which video imaging technology (such as a CCD imaging device) is used. If a collection of vehicles is imaged, spatial isolation as well as temporal isolation of the flickers from the different vehicles is possible. A flickering pixel or pixel group can be detected and filtered from the rest of the image and analyzed. Any simultaneous flickering from another area of the image could be stored for later analysis by a single decoder, avoiding the need for two decoders. A CCD can also be used as a non-imaging photodetector.

MULTIPLE LAMPS AND WAVELENGTHS. One option in this invention is to use a flicker generator that does not switch the output voltage on and off, but instead switches between two lamps. For example, the brake (and/or running lamps) that are continuously lit with flickering interruptions at intervals, and side lamps that are dark with flicker blips at intervals, could have "negative" flicker patterns, being off and on conversely. (That corresponds to the scan of a photographic negative image of a bar code.)

FIG. 1 shows a circuit for this switching. The signal to the lamp 110 also goes to an inverter 132 and a second lamp 130, which emits an inverted "negative" flicker, and is off while the lamp 110 is on (and conversely).

This switching would require two types of detector, each type reading a straight or inverted flicker, or, alternatively, a processor that would recognize either the flicker or its negative, and process accordingly (so-called "autodiscrimination"; see Palmer). Alternatively, and inverter can be used in the vehicle. The side lamp can optionally emit in the infrared, like a TV remote, to be invisible.

The brake or running lamp can of course include both an LED that is dedicated to flickering and non-flickering lamps such as incandescent lamps.

ANTI-TAMPERING PROVISIONS. Preferably, at least one of the lamps will be mounted in a position where its removal will be evident; for example, it can be potted inside one of the roof-support columns with a small hole in the sheet metal through which the LED shines. A flicker unit (including a lamp and drive circuits) can be fastened there, embedded in a potting compound such as epoxy and/or a mechanically fastened, with the lamp aligned with a small hole in the sheet metal. Such a unit would be difficult to remove and also difficult to replace if it were removed. (At the factory, a special jig would align the hole and the lamp.) The powering wire from the front panel or brake pedal can be routed so that it is also difficult to by-pass the unit 100 and thereby stop the flickering without also disabling the brake or stop lights. A hard-to-remove flicker unit like that could directly shine to, for example, the side of the vehicle with a "positive" infrared flicker while driving the brake lamp through an inverter to flicker in a "negative" flickering, as discussed above, with a red LED.

(This invention also covers less secure installations. If flickering lamps are added to vehicles after purchase (like the radio tags of the E-Z Pass system), then the lamps can be, e.g., glued to the inside of a window or the windshield.)

A detector according to this invention can optionally include at least one additional sensor to detect any vehicle regardless of the flickering light, whereby the presence of a non-flickering vehicle is detected. This might be useful in some security applications. Such an additional sensor can include a sound sensor, a heat sensor, a motion sensor, an image sensor, and/or a road-mounted vehicle weight sensor.

As noted above, the invention can include augmented VIN's with at least one extra, secret character or numeral. The VIN plate, vehicle title, and other public records would omit the secret portion of the VIN, which would be kept in a central databank. When a complete (flickered) VIN were sent to the databank, the incoming identifier would be checked against a secret database. The only response from the databank would be "authentic" or "fake". Any faked flickering VIN could thus be detected rapidly.

The VIN includes a check digit at position 9, which is different from the secret datum of this invention. However, the invention does not rule out additional check digits in an augmented VIN as needed for technological workability.

APPLICATIONS OF THE INVENTION. A major use of this invention is rapid detection of stolen vehicles and vehicles wanted in connection with crimes or terrorism. Once a network of detectors is in place, a vehicle will not be able to drive far without alerting the authorities that a wanted vehicle was at a specific location at specific time.

Detectors set up near potential terrorist targets and rigged with alarms, or triggering automatic roadblocks, could prevent attacks. The invention can also be used to select certain vehicles for investigation.

The invention can be used to record all vehicles that have entered a building or area. In one bombing of the World Trade Center, the perpetrators were found because of a VIN plate that survived the bomb blast. But that plate could easily have been lost or destroyed in the blast, and no record of that vehicle entering the building would have existed. With this invention in use, the VIN of that vehicle could have been already registered and downloaded to a secure location.

The invention is non-obtrusive, especially because the flickering is invisible in the preferred embodiment, and the invention will not delay innocent citizens. In fact, people will be unaware that they are being surveilled in most cases.

Police can use a dial-up service to determine the history of any vehicle (not just vehicles included in the "wanted" database 250 of FIG. 2), prior to making contact with the driver. Information about the owner (who is most probably also the driver) can be made be available; for example, whether the owner has a criminal record. The detector 200 can be pointed, or a hand-held auxiliary device can be aimed, to isolate any vehicle. If the full VIN is used as the identifier, the make, model year, and type of vehicle (car, bus, etc.) will be instantly available because they are encoded in the VIN, and the police can use that information to cross-check their identification of the vehicle.

Especially if low-current CMOS circuits are used, then the battery drain of this invention will be minimal. Therefore, a flickering lamp can be left on whenever the vehicle's battery is connected. The lamp would appear to be continuously lit, as discussed above, though actually emitting light for only a small fraction of the time. The side lamps of parked vehicles could be scanned by side-mounted detectors on police cars.

While the police might be the main users of this invention, the vehicle-tracking feature will also be useful at toll booths and to government agencies and private companies for verifying the locations and/or routes of company fleets or other sets of flickering vehicles. For private use, a system with only one detector could be useful: for example, a parking lot could register entering and exiting vehicles both for billing purposes and to block unauthorized attempts at parking. In this application, a flicker unit mounted inside the windshield might be used.

The invention can be retrofitted to a fleet of vehicles for making older vehicles register in the system of detectors described above, or for a special purpose like routing.

The invention is not limited to the particular embodiments specifically recited but rather encompasses all within the scope of the following claims. The present disclosure is not to be construed as limiting the scope of the invention or of the following claims.

The objects of the invention are apparent from the description above.

While the VIN is the preferred identifier, any other identifying number, character, etc., can be used in this invention. The identifier can be numeric, alphanumeric, alphabetical, or symbolic, or a pure binary number or pattern.

The flickering lamp of this invention can, as an alternative, radiate light in more than one intensity so that the encoding of the vehicle identifier is other than binary. For example, three states would be provided by two light levels of higher and lower intensity and a lamp-off state. However, binary encoding with only one lamp-on state is preferred.

Besides the telescopic detector discussed above, this invention can also use a narrow-beam lamp. For example, if the flickering light from a lamp is directed toward the front of the vehicle, optical elements such as mirrors and/or lenses could be used to send more of the emitted light into a narrow solid angle, so that the flickering could be brighter in the forward direction at the expense of the side directions. Even when the light is intended to be directed all around the horizon or through a broad angle, the light from an LED can be directed away from the zenith and nadir toward the horizon for better efficiency.

Encoding based on the timing of pulses is also possible. One example would be uniform short light blips, each indistinguishable from the others, but conveying information through their timing (somewhat like FM radio or phase modulation).

The invention also includes the use of analog encoding and any other encoding that will work in this invention.

Above, and in the following claims:

"alarm" means any device for alerting or notifying a user, and also includes a trigger (for example, a device to open a gate automatically) that functions without human intervention.

"alphanumeric" means comprised of letters, numerals, symbols, or any combinations thereof, "ASCII" means the American Standard Code for Information Exchange and/or related codes such as BCDIC, EBCDIC, or the like;

"binary flickering rate interval" means the time occupied by a binary digit or pulse;

"flickering duration" means the time taken to flicker out an identifier and associated data or signals;

"flicker repetition interval" means the time between the start of one flickered identifier and the start of a succeeding flickered identifier;

"identifier" means any pattern that can be associated with a land vehicle;

"processor " means any digital or analog/digital device which processes data, such as an electronic circuit, a microprocessor, or a programmed computer;

"lamp" is any device producing light;

"LED" means any solid-state lamp or light-emitting device, and is not limited to diodes;

"light" means visible light, far and/or near infrared and ultraviolet light;

"search engine" means any database searching device, program, or circuit;

"set" has the mathematical meaning of any group, including any subset or a whole;

"vehicle" means a movable conveyance or device, whether self-powered, pulled, or driven;

"VIN" means vehicle identification number and/or any identifier determined under 49 C.F.R. §565.

I claim:

1. A set of land vehicles wherein each one of the vehicles comprises a flickering lamp further comprising a vehicle brake lamp or a vehicle rear running lamp, and wherein a flickering light from the lamp comprises an identifier of that vehicle; and wherein a flickering rate interval is shorter than an interval of human persistence of vision, whereby the flickering is invisible.

2. The vehicles according to claim 1, wherein the lamp alternates between a lightemitting state and an essentially non-light-emitting state while flickering, whereby the flickering light from the lamp comprises binary data.

3. The vehicles according to claim 2, wherein the identifier comprises a binary-encoded alphanumeric identifier.

4. The vehicles according to claim 3, wherein the identifier is a VIN of the individual vehicle.

5. The vehicles according to claim 3, wherein the identifier is encoded by at least one of ASCII, Code 93, Code 39, Code 128, and the 2 of 5 Code.

6. The vehicles according to claim 1, wherein the lamp comprises an LED.

7. The vehicles according to claim 5, wherein the LED emits visible light, and the visible light comprises red light consisting essentially of light having a wavelength between 650 nm and 680 nm.

8. The vehicles according to claim 1, wherein flickering repetitiously alternates with non-flickering, whereby overlapping flickers from different ones of the vehicles are avoided.

9. The vehicles according to claim 8, wherein a binary flickering rate interval is shorter than an interval of human persistence of vision and the flicker repetition interval is also shorter than the interval of human persistence of vision, whereby the flickering is invisible.

10. The vehicles according to claim 8, wherein the non-flickering comprises the lamp being in an essentially non-light-emitting state between flickers.

11. The vehicles according to claim 8, wherein the non-flickering comprises the lamp being in a light-emitting state between flickers, and a binary flickering rate interval is shorter than an interval of human persistence of vision, whereby the flickering is invisible.

12. The vehicles according to claim 11, wherein a flickering duration is at least ten times shorter than a flicker repetition interval.

13. The vehicles according to claim 8, wherein the lamp is free-running and flickers continually.

14. The vehicles according to claim 1, comprising a drive signal inverter and a second negative-signal lamp, wherein negative-signal lamp is in the light-emitting state when the other lamp is in the essentially non-light-emitting state, and conversely.

15. The vehicles according to claim 1, wherein the identifier of that vehicle is shared in common with another vehicle of the set of land vehicles.

16. In combination:

(a) a set of land vehicles wherein each one of the vehicles comprises a flickering lamp further comprising a vehicle brake lamp or a vehicle rear running lamp, and wherein a flickering light from the lamp comprises an identifier of that individual vehicle;

wherein a flickering rate interval is shorter than an interval of human persistence of vision, whereby the flickering is invisible; and (b) at least one detector to decode the flickering light of the vehicle into the vehicle identifier; and (c) at least one identifier database communicating with the detector.

17. The combination according to claim 16, comprising a database search engine to determine if the detected vehicle identifier is in the database, and an alarm to alert a user if the detected vehicle identifier is in the database.

18. The combination according to claim 16, wherein the detector writes the identifier to the database and/or an auxiliary database.

19. The combination according to claim 16, wherein the detector comprises a detector clock running at a frequency rationally related to a bit rate of the binary encoding.

20. A set of land vehicles wherein each one of the vehicles comprises a flickering vehicle lamp, wherein a flickering light from the lamp comprises an identifier of that vehicle, wherein the flickering is shorter than an interval of human persistence of vision, and wherein the flickering is invisible to the human eye.

* * * * *